United States Patent
Ishizaki et al.

(10) Patent No.: US 10,104,356 B2
(45) Date of Patent: Oct. 16, 2018

(54) SCENARIO GENERATION SYSTEM, SCENARIO GENERATION METHOD AND SCENARIO GENERATION PROGRAM

(71) Applicant: KDDI CORPORATION, Shinjuku-ku, Tokyo (JP)

(72) Inventors: Hiromi Ishizaki, Fujimino (JP); Gen Hattori, Fujimino (JP); Yasuhiro Takishima, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 14/901,348

(22) PCT Filed: Jun. 25, 2014

(86) PCT No.: PCT/JP2014/066800
§ 371 (c)(1),
(2) Date: Dec. 28, 2015

(87) PCT Pub. No.: WO2014/208581
PCT Pub. Date: Dec. 31, 2014

(65) Prior Publication Data
US 2016/0134855 A1    May 12, 2016

(30) Foreign Application Priority Data
Jun. 26, 2013   (JP) .................................. 2013-133980

(51) Int. Cl.
*H04N 9/802* (2006.01)
*H04N 21/43* (2011.01)
(Continued)

(52) U.S. Cl.
CPC ............. *H04N 9/802* (2013.01); *G10H 1/368* (2013.01); *G11B 27/031* (2013.01); *G11B 27/10* (2013.01);
(Continued)

(58) Field of Classification Search
None
See application file for complete search history.

(56) References Cited

U.S. PATENT DOCUMENTS

| 2009/0307207 A1* | 12/2009 | Murray | G06F 17/30026 |
| 2011/0055213 A1* | 3/2011 | Ishizaki | G06F 17/30056 |
| | | | 707/737 |
| 2012/0259634 A1* | 10/2012 | Tsunokawa | G11B 27/105 |
| | | | 704/235 |

FOREIGN PATENT DOCUMENTS

| JP | 2003-108155 A | 4/2003 |
| JP | 2003-295870 A | 10/2003 |

(Continued)

OTHER PUBLICATIONS

Official Communication issued in International Patent Application No. PCT/JP2014/066800, dated Aug. 19, 2014.
(Continued)

*Primary Examiner* — Heather R Jones
(74) *Attorney, Agent, or Firm* — Keating & Bennett, LLP (57) ABSTRACT

A scenario generation system, a scenario generation method, and a scenario generation program are provided. A scenario generation system used for video playback synchronized with musical piece playback includes a situation estimating portion for estimating a situation expressed by the musical piece, a video specifying portion for specifying at least one video suited for the estimated situation in the video constituted by scenes each having a time-series order, and a scenario generating portion for generating a scenario associating the scenes constituting the specified video with each section of the musical piece. As a result, a scenario can be generated by the scenes each having the time-series order, and the synchronized video with a natural impression can be reproduced corresponding to the musical piece playback on the basis of the scenario.

10 Claims, 10 Drawing Sheets

(51) Int. Cl.
G10H 1/36 (2006.01)
H04N 21/458 (2011.01)
H04N 21/422 (2011.01)
H04N 21/439 (2011.01)
H04N 21/475 (2011.01)
H04N 21/482 (2011.01)
H04N 21/8405 (2011.01)
H04N 21/845 (2011.01)
H04N 21/8541 (2011.01)
H04N 21/8547 (2011.01)
H04N 21/858 (2011.01)
G11B 27/10 (2006.01)
H04N 9/87 (2006.01)
H04N 9/89 (2006.01)
G11B 27/031 (2006.01)
H04N 5/76 (2006.01)

(52) U.S. Cl.
CPC ............... *H04N 9/87* (2013.01); *H04N 9/89* (2013.01); *H04N 21/42203* (2013.01); *H04N 21/4307* (2013.01); *H04N 21/439* (2013.01); *H04N 21/458* (2013.01); *H04N 21/4756* (2013.01); *H04N 21/4828* (2013.01); *H04N 21/8405* (2013.01); *H04N 21/8456* (2013.01); *H04N 21/858* (2013.01); *H04N 21/8541* (2013.01); *H04N 21/8547* (2013.01); *G10H 2220/005* (2013.01); *G10H 2240/081* (2013.01); *G10H 2240/131* (2013.01); *H04N 5/76* (2013.01)

(56) References Cited

FOREIGN PATENT DOCUMENTS

| JP | 2003295870 A | * | 10/2003 | ............ G10K 15/04 |
|----|--------------|---|---------|------------------------|
| JP | 2004-354423 A |  | 12/2004 |  |
| JP | 2010-044484 A |  | 2/2010 |  |
| JP | 2011-075701 A |  | 4/2011 |  |
| JP | 2012-014595 A |  | 1/2012 |  |

OTHER PUBLICATIONS

Funasawa et al., "A Proposal for Synchronized Web Image and Music Playback System Using Lyrics", FIT2009, the 8th Forum of Information Technology, Lecture Paper Collection, Information Processing Society of Japan, Institute of Electronics, Information and Communication Engineers, vol. 2, Aug. 20, 2009, 10 pages.

Funasawa et al., "A Study on Music Classification for Music Retrieval Based on Lyrics", the 71st National Assembly of Information Processing Society of Japan, 5R-2, 2009, 12 pages.

Joachims, "SVMlight", Support Vector Machine, Cornell University, Version 6.02, Aug. 14, 2008, 12 pages.

"MeCab: Yet Another Part-of-Speech and Morphological Analyzer", Jun. 18, 2013, 11 pages.

* cited by examiner

ENTIRE IMAGE

TITLE, GENRE, MODEL, CLOTHES, PLACE,
SEASON SENSE, WEATHER, LOCATION, CONTENTS, ACTUAL VIEW,
CAST, PREFECTURE, SUB-GENRE, PLACE,
AGE, THEME, EVENT, MOOD, LOVE AND THE LIKE

EACH SCENE

SUBJECT: KEYWORD AND THE LIKE
PLACE: INDOOR, MOUNTAIN, RIVER, ROAD, STATION, NAME OF PLACE AND THE LIKE
SEASON: SPRING, SUMMER, AUTUMN, WINTER
TENSE: PRESENT, PAST, FUTURE AND THE LIKE
WEATHER: SUNNY, RAIN, CLOUDY, SNOW AND THE LIKE
PERSON: NUMBER OF PERSONS, SEX, AGE, CLOTHES, BEHAVIOR, DIRECTION, EMOTION
CUT-IN/OUT: SIMPLE CUT, DISSOLVE, WIPE
EVALUATION: EXCELLENT, GOOD, FAIR, POOR
            (SCENES NOT DESIRABLE TO BE USED SHALL BE POOR)

FIG.4

| ID | TRANSITION | SUBJECT | PLACE | SEASON | TIME | NUMBER OF PERSONS | PERSON | | |
|---|---|---|---|---|---|---|---|---|---|
| | | | | | | | SEX | AGE | BEHAVIOR |
| 001 | — | CHERRY BLOSSOM, BLUE SKY | CHERRY BLOSSOM TREES | SPRING | MORNING, DAYTIME | 0 | — | — | — |
| 001-1 | — | CHERRY BLOSSOM | CHERRY BLOSSOM TREES | SPRING | MORNING, DAYTIME | 0 | — | — | — |
| 001-2 | — | CHERRY BLOSSOM | CHERRY BLOSSOM TREES | SPRING | MORNING, DAYTIME | 0 | — | — | — |
| 002 | O | | | | | | | | |
| 003 | — | CHERRY BLOSSOM, BRIDGE, PERSON | PARK | SPRING | MORNING, DAYTIME | 1 | MALE | IN FIFTIES OR OVER | WALK |
| 003-1 | — | CHERRY BLOSSOM, BRIDGE, PERSON | PARK | SPRING | MORNING, DAYTIME | 1 | MALE | IN FIFTIES OR OVER | WALK |
| 003-2 | — | POND, GOOSE | PARK | SPRING | MORNING, DAYTIME | 0 | — | — | |
| 003-3 | O | | | | | | | | |
| 003-4 | — | CHERRY BLOSSOM, BRIDGE, PERSON, POND | PARK | SPRING | MORNING, DAYTIME | 1 | MALE | IN FIFTIES OR OVER | STATIONARY |
| 004-1 | — | CHERRY BLOSSOM, BRIDGE, PERSON | PARK | SPRING | MORNING, DAYTIME | 1 | MALE | IN FIFTIES OR OVER | STATIONARY |
| 004-2 | O | | | | | | | | |

| WHO | SEX | MALE, FEMALE |
| --- | --- | --- |
| | AGE | TEENS, TWENTIES, THIRTIES |
| | OCCUPATION | PAID WORKER, STUDENT, FISHERMAN, ··· |
| WHAT | ACTIVITY | DRIVING, CYCLING, PARTY |
| | EVENT | CHRISTMAS, SPORTS FESTIVAL, WEDDING, ALUMNI REUNION ··· |
| | THEME | |
| | LYRICS WORD | LOVE, YOUTH, DREAM, JOB, FAMILY ··· |
| WHEN | SEASON | SPRING, SUMMER, AUTUMN, WINTER |
| | WEATHER | SUNNY, RAIN, CLOUDY ··· |
| | TIME SLOT | MORNING, DAYTIME, EVENING, NIGHT, MIDNIGHT, EARLY MORNING ··· |
| WHERE | PLACE | MOUNTAIN, RIVER, SEA, TOWN, INDOOR, ROOM, ··· |
| | VEHICLE | TRAIN, BOAT, CAR, AIRPLANE |
| WHY | EMOTION | HAPPY, DELIGHTED, EXCITED ··· |
| | LOVE | ONE-SIDED LOVE, CONFESSION, PASSIONATE LOVE, CHEATING ··· |
| HOW | VEHICLE | TRAIN, BOAT, CAR, AIRPLANE |
| | LYRICS WORD | |
| OTHER | LOVE | ON-SIDED LOVE, CONFESSION, PASSIONATE LOVE, CHEATING ··· |
| | LYRICS WORD | |

| MUSICAL PIECE ID | 2156 |
|---|---|
| SONG NAME | SUMMER IN ISLAND COUNTRY |
| META INFORMATION | JAPANESE BALLAD, MASAO ICHIMAN |

| SECTION | START TIME | LYRICS | PIVOTAL IMAGE ID | ADJUSTMENT IMAGE ID |
|---|---|---|---|---|
| Pp | 00:00:00:00 | <♪INTRODUCTION> | A0000-1 | |
| P1 | 00:00:29:00 | MOUNTAIN WIND, BLUE SKY, WHITE UMBRELLA | | Z0012-9 |
| | 00:00:40:00 | THAT SOUTHERN MOUNTAIN ON WHICH MAGNOLIA BLOOMS | | |
| | 00:00:43:00 | HAS SPRING IN ISLAND COUNTRY COME? | | |
| | 00:00:51:00 | IN MY HOMETOWN | | |
| P2 | 00:00:57:00 | THERE IS NOTHING LIKE THAT | A0000-3 | |
| | 00:01:02:00 | BIG BOX SENT FROM RELATIVE | | |
| | 00:01:12:00 | SHOULD I COME BACK TO THAT TOWN | | |
| | 00:01:18:00 | NO, I WOULD NOT | | |
| Pi1 | 00:01:24:00 | <♪INTERLUDE> | A0000-5 | |
| P3 | 00:01:35:00 | SNOW, ICICLE, SNOWMAN | | S0233-21 |
| | 00:01:46:00 | BRIGHT YELLOW RIPPLES | | |
| | 00:01:49:00 | ECHO IN SPRING IN ISLAND COUNTRY | | |
| | 00:01:57:00 | WE BOTH LOVED EACH OTHER | | |
| P4 | 00:02:02:00 | I AM SO ASHAMED | A0000-7 | |
| | 00:02:08:00 | 13 YEARS SINCE WE PARTED EACH OTHER | | |
| | 00:02:13:00 | MY CHILDHOOD FRIEND GOT MARRIED | | |
| | 00:02:19:00 | SHOULD I COME BACK TO THAT TOWN | | |
| | 00:02:25:00 | NO, I WOULD NOT | | |
| Pi2 | 00:02:29:00 | <♪INTERLUDE> | A0000-8 | |
| P5 | 00:02:52:00 | HILL COVERED WITH GRASS | | B0123-1 |
| | 00:03:03:00 | I HEAR LULLAB | | |
| | 00:03:06:00 | NO RELEVANCE TO SPRING IN ISLAND COUNTRY | | |
| | 00:03:14:00 | YAMAGUCHI NEXT DOOR AND I | | |
| P6 | 00:03:20:00 | HAD SILENT RELATIONSHIP | A0000-10 | |
| | 00:03:25:00 | BUT ONCE IN A WHILE | | |
| | 00:03:30:00 | SHALL I BUY HIM SODA? | | |
| | 00:03:35:00 | SHOULD I COME BACK TO THAT TOWN | | |
| | 00:03:42:00 | NO, I WOULD NOT | | |
| Pe | 00:03:47:00 | <♪ENDING> | A0000-11 | |

FIG.10

SCENARIO GENERATION SYSTEM, SCENARIO GENERATION METHOD AND SCENARIO GENERATION PROGRAM

TECHNICAL FIELD

The present invention relates to a scenario generation system, a scenario generation method, and a scenario generation program for generating a scenario used for image reproduction synchronized with musical piece reproduction.

BACKGROUND ART

In a currently used Karaoke system, a background image of a musical piece and lyrics is reproduced on a display screen. The background image is seen not only by a singer but also by those present at the site and is required to be an image suitable for the musical piece.

For example, the device described in Patent Literature 1 generates a background image by connecting motion data to each other, using the motion data selected on the basis of the musical piece as a target when an image content is generated according to a change of the music of the musical piece.

The system described in Patent Literature 2 allows users to enjoy Karaoke while displaying a Karaoke background image with a wide variety, by generating the Karaoke background image using a plurality of images extracted from various images uploaded from a mobile phone or the like when Karaoke is used.

The device described in Patent Literature 3 generates an image in accordance with meaning of lyrics emerging with progress of a reproduced musical piece. The above device outputs a selected desirable reproduced musical piece and generates the image in which characters are changed in accordance with emotions such as intonation.

The system described in Patent Literature 4 enables intermittent reproduction of a long story image with Karaoke performance and performs intermittent reproduction in parallel with image data in a time division manner.

CITATION LIST

Patent Literature

PTL 1: Japanese Patent Laid-Open No. 2010-044484
PTL 2: Japanese Patent Laid-Open No. 2011-075701
PTL 3: Japanese Patent Laid-Open No. 2004-354423
PTL 4: Japanese Patent Laid-Open No. 2003-108155

Non Patent Literature

NPL 1: "A Proposal for Synchronized Web Image and Music Reproduction System using Lyrics" by Shintaro Funasawa, Hiromi Ishizaki, Keiichiro Hoashi, Yasuhiro Takishima, Jiro Katto, FIT2009, The $8^{th}$ Forum on Information Technology, Lecture Paper Collection, Information Processing Society of Japan, Institute of Electronics, Information and Communication Engineers, Aug. 20, 2009, Second Vol., pp. 333 to 334
NPL 2: "A study on Music Section for Music Retrieval based on Lyrics" by Shintaro Funasawa, Hiromi Ishizaki, Keiichiro Hoashi, Yasuhiro Takishima, Jiro Katto, The $71^{st}$ National Assembly of Information Processing Society of Japan, 5R-2 (2009).
NPL 3: Thorsten Joachims, "SVMLIGHT", [online], Aug. 14, 2008, Cornell University, [searched on Jun. 18, 2013], Internet <URL: http://svmlight.joachims.org/>
NPL 4: "Mecab", [online], [searched on Jun. 18, 2013], Internet <URL: http://mecab.googlecode.com/svn/trunk/mecab/doc/index.html>

SUMMARY OF INVENTION

Technical Problem

However, in the devices described above, it is difficult to generate various background images by combining material images stored in a database. That is, a synchronized image cannot be reproduced with an image suitable for each section of musical pieces in the order maintaining a time series, and the synchronized images with a natural impression corresponding to the musical piece reproduction cannot be reproduced. As a result, it becomes difficult to ensure story characteristics in the background image by changing the background image in accordance with contents of lyrics of the musical piece.

The present invention was made in view of these circumstances and has an object to provide a scenario generation system, a scenario generation method, and a scenario generation program that can generate a scenario by scenes having a time-series order and reproduce the synchronized image with a natural impression corresponding to musical piece reproduction.

Solution to Problem (1) In order to achieve the aforementioned object, the scenario generation system of the present invention is a scenario generation system used for image reproduction synchronized with musical piece reproduction including: a situation estimating portion for estimating a situation expressed by the musical piece; an image specifying portion for specifying at least one image suited for the estimated situation from the images constituted by scenes having a time-series order; and a scenario generating portion for generating a scenario associating the scenes constituting the specified image with each section of the musical piece. As a result, a scenario can be generated by the scenes having a time-series order, and the synchronized image with a natural impression corresponding to the musical piece reproduction can be reproduced on the basis of the scenario.

(2) Moreover, in the scenario generation system of the present invention, the scenario generating portion generates a scenario associating the scene of the specified image with each section of the musical piece while maintaining the time-series order. As a result, it is possible to further generate the scenario of the synchronized image in which the image is matched with each section of the musical piece can be generated while maintaining the time-series order of the original image scene.

(3) Moreover, in the scenario generation system of the present invention, the situation estimating portion estimates a situation expressed by the musical piece by analyzing lyrics of the musical piece. As described above, it is possible to cause an image accurately matching the musical piece to correspond by analyzing the lyrics of the musical piece.

(4) Moreover, the scenario generation system of the present invention further includes an adjustment image specifying portion for extracting a keyword from the lyrics of the musical piece for each section of the musical piece and for specifying an adjustment image using the extracted keyword, and a scenario adjustment portion for adjusting the scenario by using the adjustment image while maintaining the time-series order of the scenes specified in the scenario.

As a result, the original scenario is complemented by using the adjustment image, and diversified and more appropriate scenario of the synchronized image can be generated.

(5) Moreover, in the scenario generation system of the present invention, the situation estimating portion estimates a situation expressed by a musical piece by estimating contents of each category corresponding to the situation expressed by the musical piece. As a result, it is possible to perform appropriate matching with the image by estimating the situation expressed by the musical piece with 5W1H as each category, for example.

(6) Moreover, in the scenario generation system of the present invention, the image adjusting portion compares the scene specified in the scenario with the adjustment image for each section of the musical piece on the basis of a reference set in advance and adopts either one of them as the scene newly specified in the scenario. As a result, it is possible to produce a scenario by adopting favorable image more suitable for the musical piece.

(7) Moreover, the scenario generation system of the present invention further includes an evaluation information collecting portion for collecting evaluations on a synchronized image by the generated scenario from viewers of the synchronized image and for storing the collected evaluations in the evaluation information DB, and an evaluation information DB for storing the collected evaluations, and the image adjustment portion modifies a combination of the scenes specified in the scenario on the basis of the evaluation information stored in the evaluation information DB. As a result, it is possible to generate the scenario by reflecting the user's evaluation.

(8) Moreover, the scenario generation system of the present invention includes a reproduction portion for reproducing the synchronized image on the basis of the generated scenario. As a result, it is possible to reproduce the synchronized image suitable for the musical piece and generated by automatically combining the image. It can be used for the background image of Karaoke, for example.

(9) Moreover, the scenario generation method of the present invention is a scenario generation method for generating a scenario used for image reproduction synchronized with musical piece reproduction, the scenario generation method including the steps of: estimating a situation expressed by a musical piece; specifying at least one image suited for the estimated situation in image constituted by scenes having a time-series order; and generating a scenario associating the scenes constituting the specified image with each section of the musical piece. As a result, it is possible to produce a scenario by the scenes each having the time-series order, and to reproduce the synchronized image with a natural impression corresponding to the musical piece reproduction on the basis of the scenario.

(10) Moreover, the scenario generation program of the present invention is a scenario generation program for generating a scenario used for image reproduction synchronized with musical piece reproduction, the scenario generation program causing a computer to execute the processes of: estimating a situation expressed by a musical piece; specifying at least one image suited for the estimated situation in image constituted by scenes having a time-series order; and generating a scenario associating the scenes constituting the specified image with each section of the musical piece. As a result, it is possible to produce a scenario by the scenes each having the time-series order, and to reproduce the synchronized image with a natural impression corresponding to the musical piece reproduction on the basis of the scenario.

Advantageous Effects of Invention

According to the present invention, it is possible to produce a scenario by the scenes each having the time-series order, and to reproduce the synchronized image with a natural impression corresponding to the musical piece reproduction on the basis of the scenario.

BRIEF DESCRIPTION OF DRAWINGS

FIG. 10 is a table illustrating a scenario format example.

DESCRIPTION OF EMBODIMENTS

Subsequently, an embodiment of the present invention will be described by referring to the attached drawings. In order to facilitate understanding of the description, the same reference numerals are given to the same constituent elements in each figure, and duplicated description will be omitted.

(Configuration of Scenario Generation System)

The scenario generation system of the present invention generates a scenario used for image reproduction synchronized with musical piece reproduction. That is, a pivotal image is selected on the basis of musical piece situation information (5W1H information, for example) estimated from musical piece lyrics, and the pivotal image and the adjustment image specified by a keyword extracted from lyrics lines are combined so that a scenario constituting background image corresponding to contents of the musical piece lyrics is generated. The scenario is an image playlist for reproduction by combining a plurality of images corresponding to the contents when the image is generated in synchronization with the lyrics.

(Configuration of Each Portion)

Figure 1:
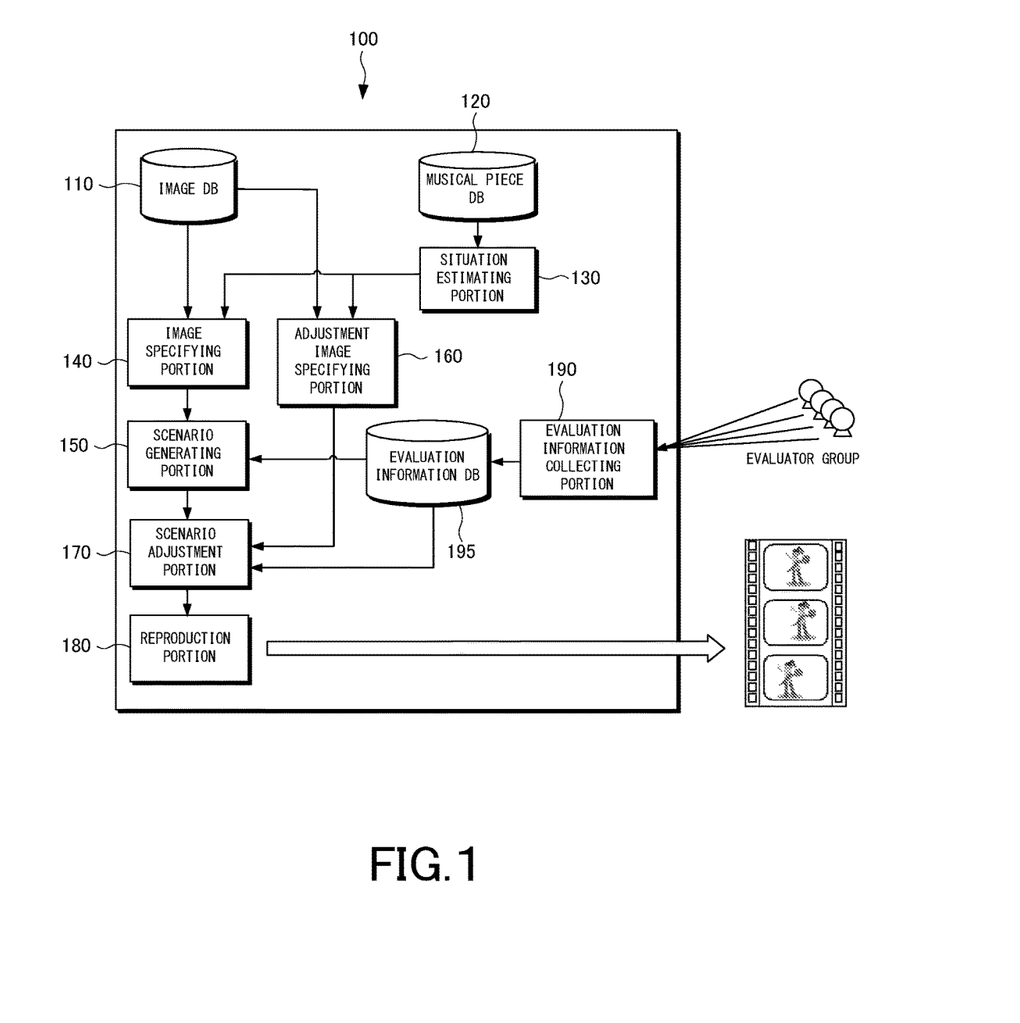
FIG. 1 is a block diagram illustrating a configuration of a scenario generation system of the present invention.

FIG. 1 is a block diagram illustrating a configuration of a scenario generation system 100. An image DB 110 stores image materials. Each of the images is given meta information in advance. The meta information is given to the entire image materials or to each scene, for example, and information included in the image such as details of a person, a season, and a time slot is associated with each other as text information and stored. The scene means a plurality of short images constituting the image and is not necessarily limited to one scene or one cut. Association between the image material and the meta information will be described later.

A musical piece DB 120 stores musical piece lyrics, sound source files, and meta information. The meta information of the musical piece includes genres, titles, artists, lyrics display time with respect to musical piece time, for example. The genre or the like can be also estimated in advance. For example, general impression word estimation by lyrics and genre determination by acoustic data can be used. The general impression word can be estimated by using the number of images searched by an image search engine or the number of unique image contributors. The genre determination by the acoustic data can be executed by classifying objects expressed by dimensional vectors by SVM (Support Vector Machine) classifying unknown data to each impression category on the basis of learning data (see NPL 1 and NPL 2). The scenarios generated once and the like can be stored with association with the musical pieces. Addition of musical pieces to be stored, update of information and the like may be executed by using a communication function.

A situation estimating portion 130 estimates a situation expressed by the musical piece by analyzing lyrics of the musical piece. As described above, it is possible to estimate scenes, situations and the like expressed by the musical piece lyrics by analyzing the text of the lyrics of the musical piece. As a result, an image accurately matching the musical piece can be specified.

The situation estimating portion 130 preferably estimates the situation expressed by the musical piece by estimating contents of each category corresponding to the situation expressed by the musical piece. For such estimation, the same meta information as the meta information to be given to the image DB 110 in advance and the category applicable to 5W1H can be used.

For example, important words are extracted from all the paragraphs of the lyrics, and a category applicable to each item of 5W1H is set in advance. Then, a discriminator such as SVM is prepared for each state word (male, female, teen and the like) in the set category, and the information with positive lyrics input result can be used as the musical piece situation information. The musical piece situation may be estimated by putting emphasis on only two or three without using all the 5W1H.

The image specifying portion 140 specifies at least one pivotal image suited for the estimated situation from the images constituted by the scenes each having the time-series order. As a result, a scenario of the synchronized image can be generated by the scenes each having the time-series order, and the synchronized image with a natural impression corresponding to the musical piece reproduction can be reproduced by the scenario. It may be so configured that a plurality of images is specified and made the pivotal image. For example, assuming that an OR search is made from keywords selected from 5W1H such as male, spring, Mr., and island country, approximately 100 pieces of image can be specified, it is possible to rank the images by calculating a degree of relevance between the meta information given to those 100 pieces and the keywords, and thus the upper ranks can be selected as the pivotal images.

A scenario generating portion 150 generates a scenario associating the scenes constituting the pivotal image with each section of the musical piece. That is, respective scenes specified as the pivotal images for each musical piece section are combined. At that time, the scenario is preferably generated while the time-series orders of the scenes constituting the pivotal image are maintained. As a result, the scenario of the synchronized image in which the scene is matched with each section of the musical piece can be generated while the time-series orders of a plurality of the scenes in the original pivotal image are maintained.

The combination of a series of images of synchronized image is made by generation of a scenario format. The scenario format will be described later. Moreover, when each scene is associated with each musical piece section, reproduction time of the scene is longer than the musical piece section in many cases, but in that case, reproduction is performed from the beginning of the scene until time of the musical piece section has elapsed. If the image is not sufficient for the associated scene, it can be complemented by the adjustment image.

An adjustment image specifying portion 160 extracts the keywords from the musical piece lyrics for each section of the musical piece and specifies the adjustment image by using the extracted keywords. The adjustment image may be a collection of scenes or may be a single scene. Since the keywords of the lyrics are basically used, the original scenario is used without adjustment for the musical piece section in which there are no lyrics (introduction, interlude).

A scenario adjustment portion 170 adjusts the scenario by using the adjustment image while maintaining the time-series order of the image specified in the scenario. That is, by evaluating a degree of relevance between the adjustment image and the scene in the pivotal image, the pivotal image is modified in accordance with the evaluation. As a result, the original scenario is complemented, and the diversified scenario more suited for the musical piece can be generated.

The scenario adjustment portion 170 compares the scene specified in the scenario with the adjustment image for each musical piece section on the basis of the reference set in advance and preferably adopts either one of them as the scene newly specified in the scenario. As a result, it is possible to generate the scenario by adopting the favorable image more suitable for the musical piece.

Moreover, the scenario adjustment portion 170 preferably modifies the combination of the scenes specified in the scenario on the basis of the information stored in an evaluation information DB 195. As a result, the scenario of the synchronized image can be generated by reflecting user's evaluation in it.

A reproduction portion 180 reproduces the synchronized image on the basis of the scenario in synchronization with reproduction of the generated musical piece. As a result, it is possible to reproduce the synchronized image suitable for the musical piece generated by automatically combining the image. It can be used for the background image of Karaoke, for example.

An evaluation information collecting portion 190 collects evaluations on the synchronized image from the viewers of the synchronized image based on the generated scenario and stores the collected evaluations in the evaluation information DB 195. For example, regarding the evaluation information, an evaluation value can be obtained in binary values of GOOD or BAD or in five ranks. Moreover, the evaluation value can be input for the entire image or for each scene. The input evaluation information is associated with the scene, the entire image or the scenario and stored in the evaluation information DB 195.

The evaluation information DB 195 stores the evaluation information on the synchronized image reproduced by the generated scenario. When the scenario of the synchronized image is adjusted in accordance with the evaluation, the evaluation information stored in the evaluation information DB 195 is extracted and used.

(Operation of Scenario Generation System)

Figure 2:
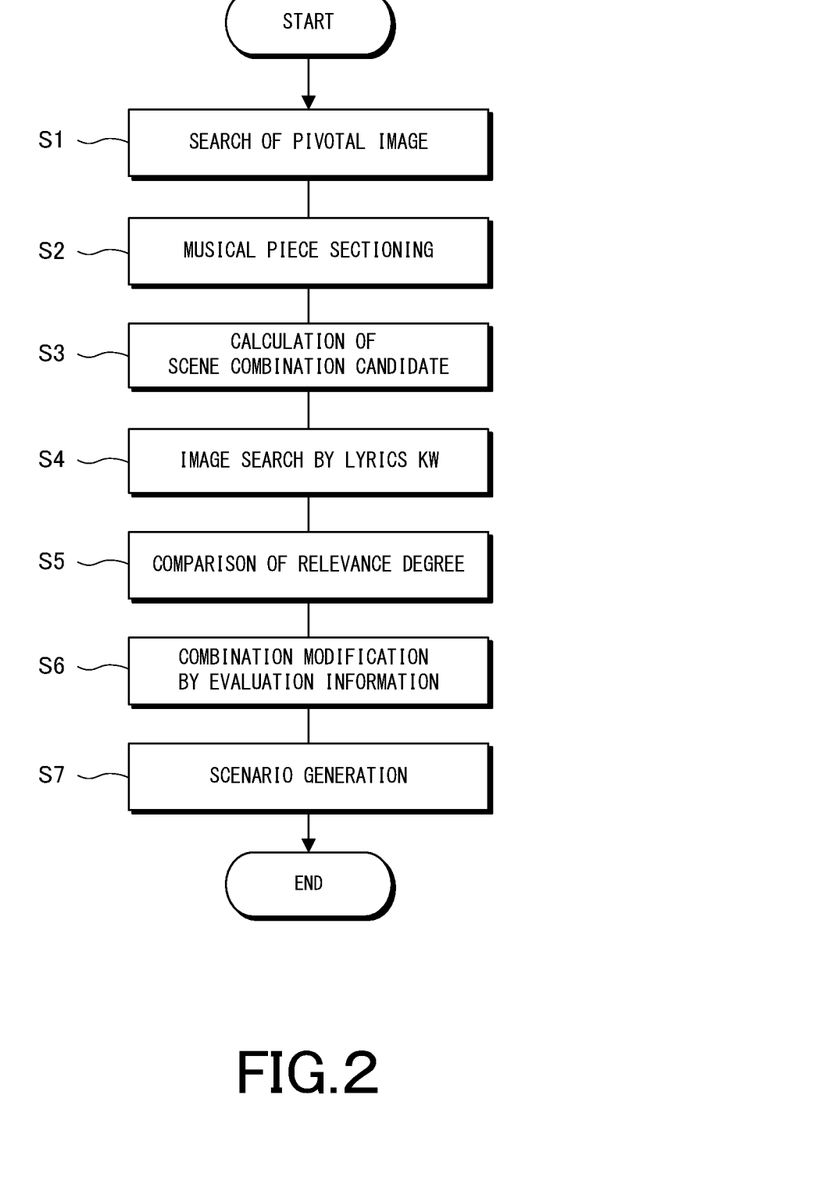
FIG. 2 is a flowchart illustrating an operation of the scenario generation system of the present invention.

Subsequently, an operation of the scenario generation system configured as above will be described. FIG. 2 is a flowchart illustrating the operation of the scenario generation system. Hereinafter, description will be made along steps S1 to S7 illustrated in FIG. 2.

(S1) Search of Pivotal Image

Image to be a pivotal image of the background image is searched in the image DB 110. It is possible to search the image by using the keyword included in the musical piece situation information, for example. One piece of image matching the situation of the musical piece may be searched from the general impression word of the lyrics and the impression word obtained from the lyrics lines (see NPL 1). Moreover, search can be made only for the image/scene including a person, the image/scene not including a person and the like by filtering.

(S2) Musical Piece Sectioning

On the basis of the lyrics information, the musical piece is divided, and an ID is given to each musical piece section. For example, unique IDs such as Pp: introduction, P1-Pn: paragraph, Pi: interlude, and Pe: ending are given to the musical piece sections. Other than the above, the paragraph may be divided into plural parts. If P1 includes 5 lines, for example, P1-1 may be given as an ID for the first three lines, while P1-2 may be given as an ID for the remaining two lines. The combination is not limited to that.

(S3) Calculation of Scene Combination Candidate

In the scene information of the pivotal image, all the combinations are listed up while the time-series order is maintained. For example, Pp:S1, P1:S3, P2:S4, . . . , Pe:S39 are listed up as the combinations of the scenes of the pivotal image.

(S4) Image Search by Lyrics KW

By using a KW (keyword) extracted from the lyrics lines included in the musical piece section P, the image is searched. If a plurality of images is searched, a search result can be narrowed by using an image with more unique contributors (see NPL 1) or by filtering the meta information of the image. Moreover, by making random selection of the narrowed result, one piece of image for the section can be searched.

(S5) Comparison of Relevance Degree

The scene combined in the pivotal image and the image searched by the lyrics KW are compared by using each division section as a unit on the basis of a comparison reference, and those matching the comparison reference or having a higher numerical value are selected. As the comparison reference, for example, (a) to (e) below and the like can be used:

(a) Those with smaller number of usage times;
(b) Those with lower degree of relevance (see NPL 1);
(c) Those with newer registration time and date;
(d) Those given more meta information; and
(e) Those with more number of evaluations or higher evaluation values in evaluation information DB 195.

(S6) Combination Modification by Evaluation Information

If the scene or the combination of scenes with lower evaluation values stored in the evaluation information DB 195 is included, it can be replaced with another scene without using the searched scene. For example, the scene in the second rank in the relevance degree comparison processing or the scene in the second rank in the search result is sequentially used.

(S7) Scenario Generation

Finally, the image reproduced in the musical piece section is recorded. The generated scenario is recorded as a scenario format, and the scenario information can be generated by the format. The operation as described above can be realized by executing a program.

(General Processing Image)

Figure 3:
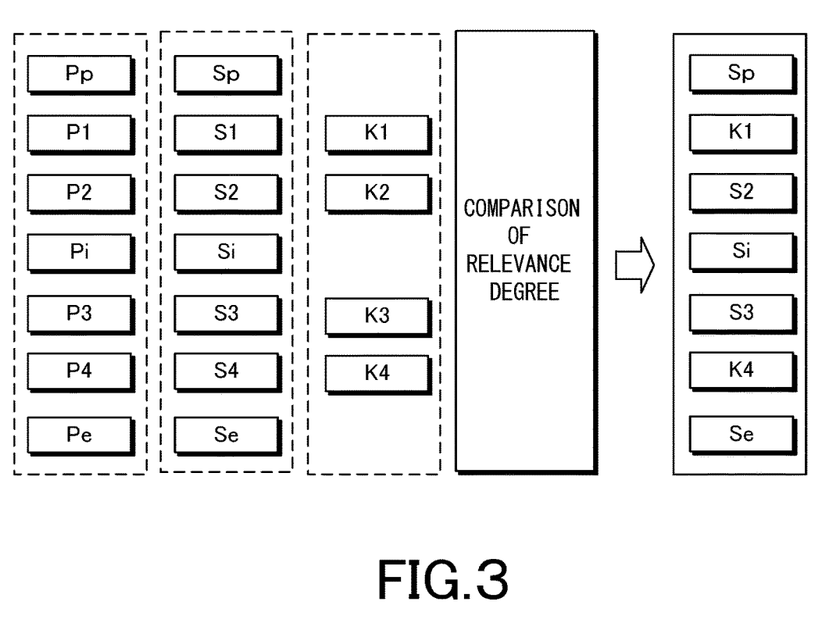
FIG. 3 is a view illustrating a processing image of generation and adjustment of a scenario.

FIG. 3 is a view illustrating a processing image of generation and adjustment of a scenario. As illustrated in FIG. 3, first, the scenario generation system associates each piece of the pivotal image (image constituted by scenes Sp to Se) with the divided section of the musical piece. For the scenario obtained as above, the image is searched by using a keyword obtained from the lyrics lines and images K1 to K4 are obtained. Then, the obtained images K1 to K4 are compared with S1, S2, S3, and S4, respectively, and the relevance degrees are evaluated. As the result of comparison of the relevance degrees, if the relevance degrees are S1<K1, S2>K2, S3>K3, and S4<K4, the image specified by the scenario is replaced by the image with higher relevance degree (S1<->K1, S4<->K4).

(Association Between Image Material and Meta Information)

Figure 4:
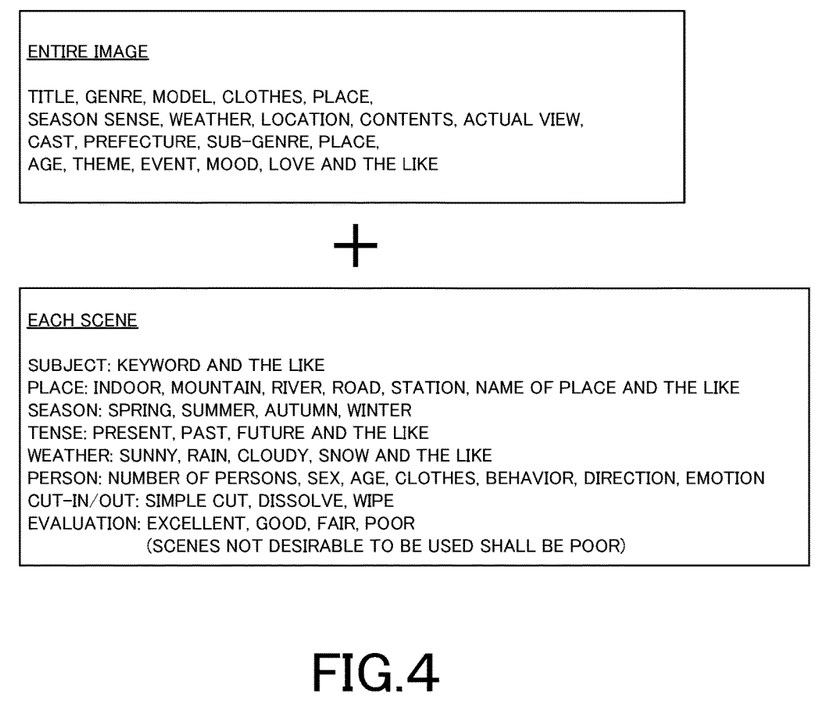
FIG. 4 is a view illustrating a relationship between meta information on an entire image and meta information of each scene.

FIG. 4 is a view illustrating the relationship between the meta information on the entire image and the meta information for each scene. As illustrated in FIG. 4, the meta information associated with the image materials stored in the image DB 110 has those for the entire materials and those for each scene. For example, the meta information for the entire materials can be managed by an ID of 001, while the meta information for each scene can be managed by 001-1, 2 and the like.

Figure 5:
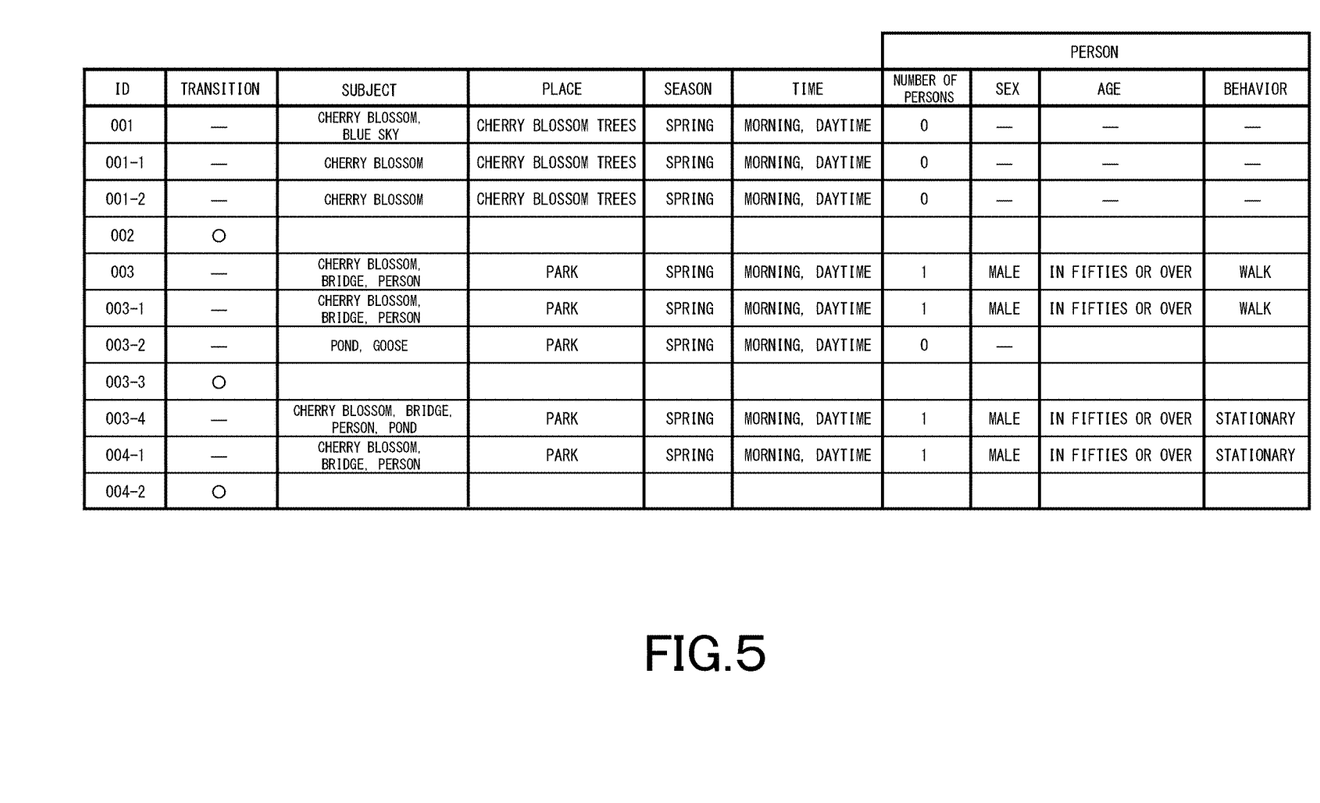
FIG. 5 is a view illustrating a table associating an image material with the meta information.

FIG. 5 is a view illustrating a table for associating the image materials with the meta information. For example, meta information such that changes are not available, the subjects are "cherry blossom" and "blue sky", the place is "cherry blossom trees", the season is "spring", the time is "morning" and "daytime", and a person is not shown is associated with the image specified by the ID 001.

(Processing Example of Musical Piece Situation Information Estimation)

Figure 6:
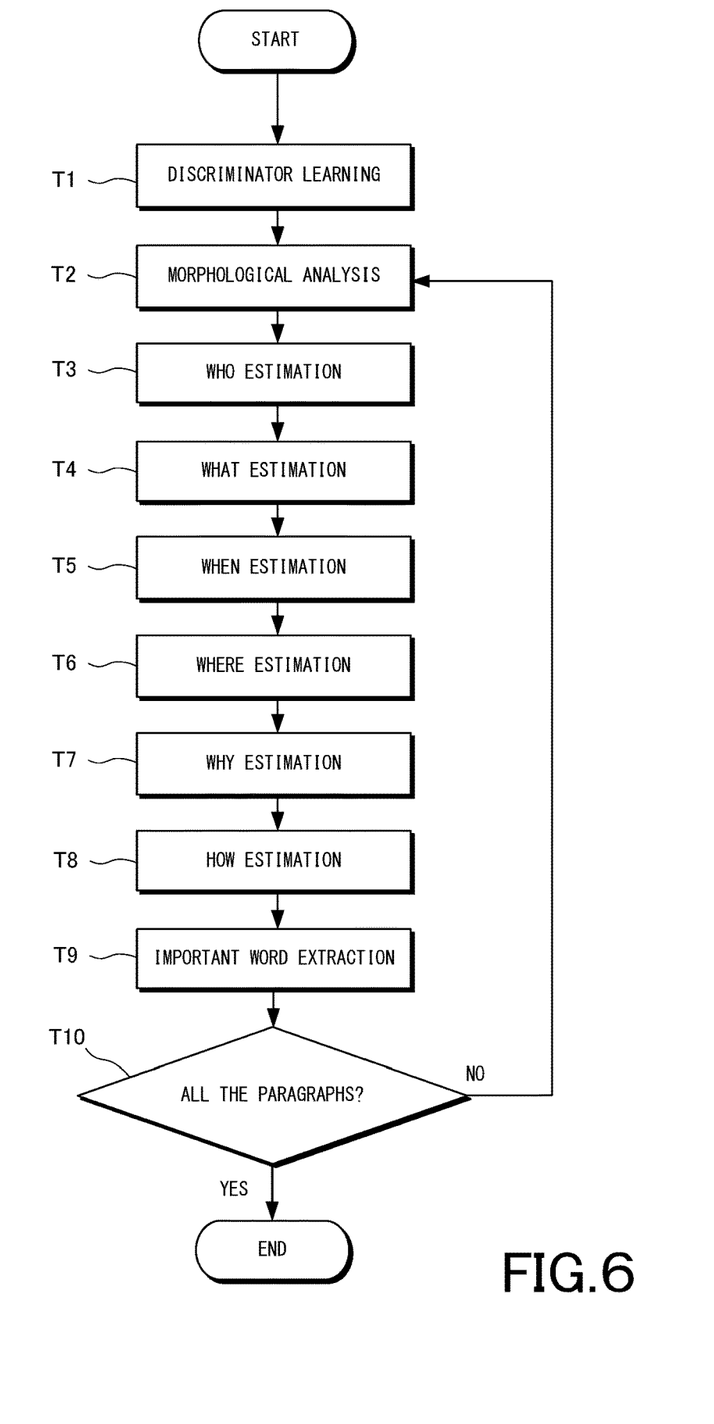
FIG. 6 is a flowchart illustrating a processing example of musical piece situation information estimation.

FIG. 6 is a flowchart illustrating a processing example of the musical piece situation information estimation. As illustrated in FIG. 6, first, learning of a discriminator is made in advance (step T1). Subsequently, morphological analysis is made for the lyrics of a specific paragraph (step T2). Then, on the basis of a word subjected to morphological analysis, WHO estimation, WHAT estimation, WHEN estimation, WHERE estimation, WHY estimation, and HOW estimation are made (steps T3 to T8). On the basis of estimation results, an important word of the lyrics of the specific paragraph is extracted (step T9). Then, it is confirmed whether the processing has been finished for all the paragraphs, and if the processing has not been finished for all the paragraphs, the process returns to step T2. If the processing has been finished for all the paragraphs, the process is completed. The operation as described above is made possible by executing the program.

Figure 7:
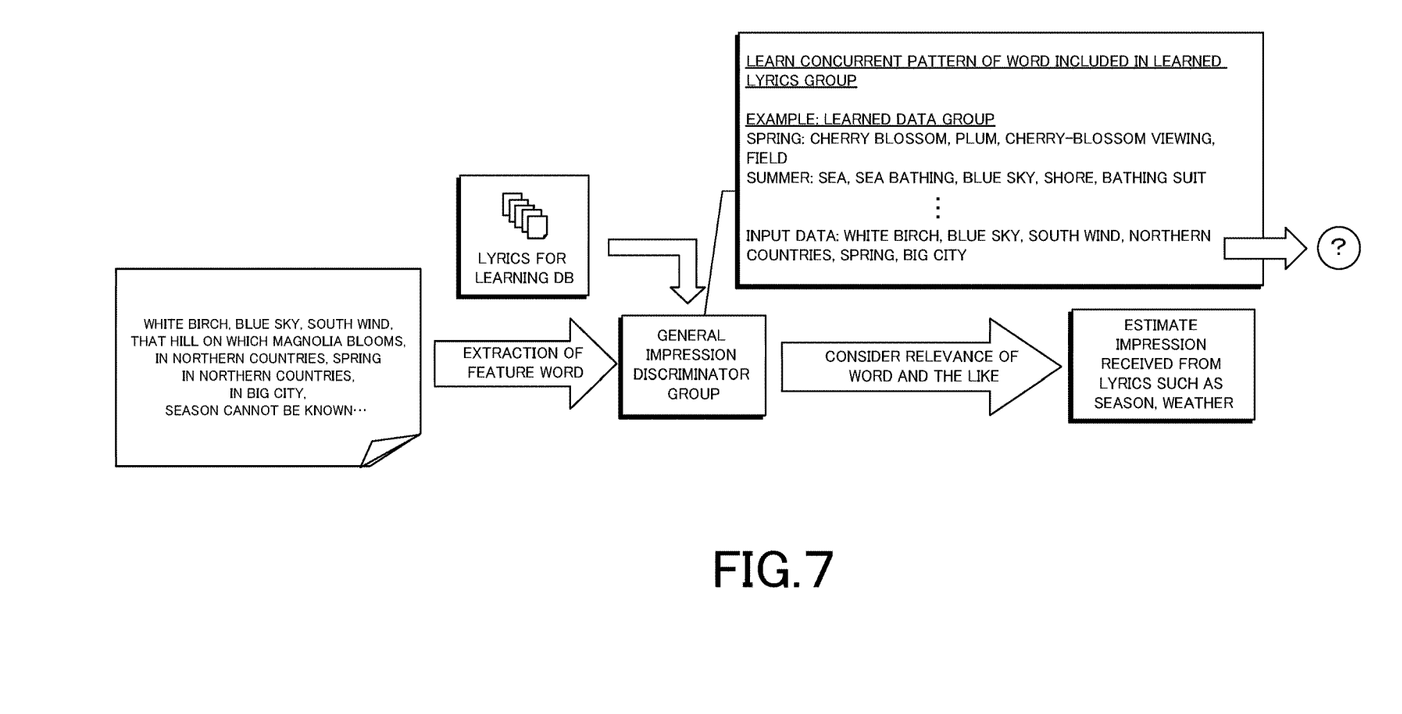
FIG. 7 is a view schematically illustrating estimation processing of an impression received from lyrics.

FIG. 7 is a view schematically illustrating the estimation processing of an impression received from the lyrics. As illustrated in FIG. 7, a group of general impression discriminators is learned by a lyrics for learning DB in advance. Then, a feature word is extracted from the lyrics and is subjected to the general impression discriminator. By considering word relevance of the obtained impression word, the impression received from the lyrics is estimated.

For example, since words like "that girl", "brother", and "father" are frequent in musical pieces from the male viewpoint, WHO can be determined to be "male". Moreover, regarding WHEN, if words like "spring", "winter", and "thawing" are found in the lyrics, it can be determined to be a time of year when snow remains. Regarding WHY, an expression like "Mom" and "five years have passed" leads to estimation that "nostalgia" is the theme.

Figure 8:
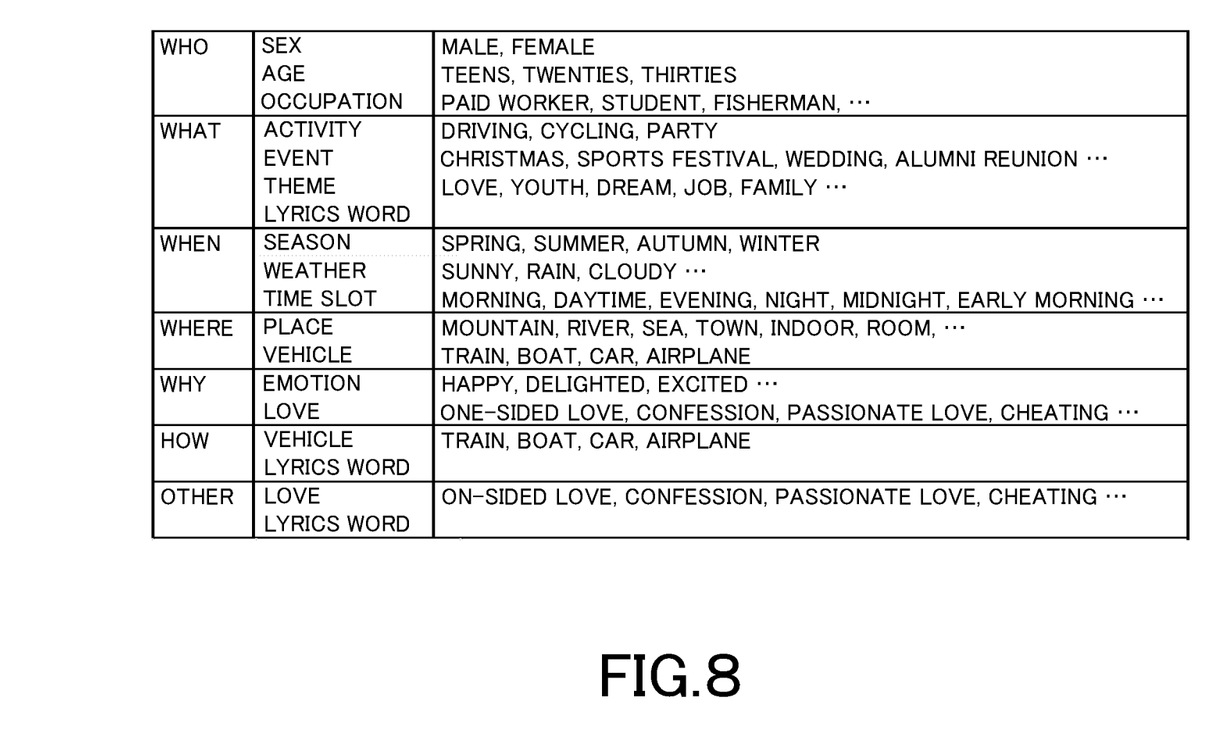
FIG. 8 is a table illustrating an example of categories set in advance and words expressing a state of each category.

FIG. 8 is a table illustrating an example of the categories set in advance and words expressing a state of each category. For example, if a result of "male" discriminator is positive and "paid worker" discriminator is positive for the WHO items, "male" and "paid worker" are used as WHO information of the situation information. The discriminator can be configured by using the SVM (see NPL 2). The estimation processing of the musical piece situation information can be divided in application such as for the entire lyrics, each paragraph, or each lyrics line. It is not always necessary to use all the estimation results for matching. On the contrary, each combination can be also used.

(Image Specification)

Figure 9:
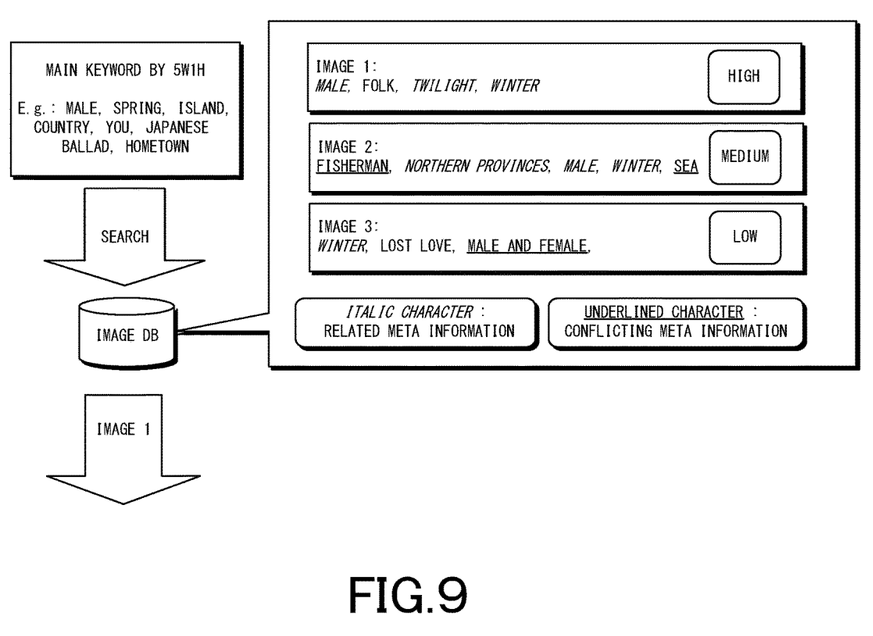
FIG. 9 is a schematic view illustrating an example of processing of specifying image.

FIG. 9 is a schematic view illustrating an example of the processing of image specification. As illustrated in FIG. 9, when the image is searched by using "male", "spring", "island", "country", "you", "Japanese ballad", and "hometown" as the main keywords by 5W1H, the images 1 to 3 are searched as candidates. In them, the keyword and the meta information of the image 1 match each other most suitably, and the image 1 has much related meta information and has no conflicting meta information. On the other hand, though the image 2 has "northern provinces", "male", and "winter" as related meta information, it has "fisherman" and "sea" as conflicting meta information, and in the image 3, "male and female" is conflicting meta information to the related meta information of "winter".

(Scenario Format)

FIG. 10 is a table illustrating a scenario format example. The scenario generating portion 150 can generate scenario information by the format as in FIG. 10, for example. A table 210 in FIG. 10 is a table associating the song name with the meta information with respect to the musical piece ID. In a table 220 in FIG. 10, the sections Pp to Pe indicate sections of the musical piece. This scenario format specifies the contents of the scenario by start time, introduction and the like or lyrics, image ID of the pivotal image, the image ID of an adjustment image for each of the sections Pp to Pe.

CONCLUSION

The scenario generation system described above is preferably configured by a client-server type system using the configuration other than the reproduction portion 180 as a server and only the reproduction portion 180 as a client, in consideration of a processing capacity and a processing speed. Alternatively, it may be a form in which only the database is used as a server, and the other configurations are used as a client so as to utilize streaming or all the configurations may be used as a client, and division to the server and the client is not limited. Moreover, in the description above, the image basically refers to moving images but it may be a still image. Particularly, as the image to be reproduced in a period of time for approximately one line of the lyrics, even a still image does not give a sense of discomfort and can be used easily.

REFERENCE SIGNS LIST 100 scenario generation system
110 image DB
120 musical piece DB
130 situation estimating portion
140 image specifying portion
150 scenario generating portion
160 adjustment image specifying portion
170 scenario adjustment portion
180 reproduction portion
190 evaluation information collecting portion
195 evaluation information DB
210, 220 table

The invention claimed is:

1. A scenario generation system used for image reproduction synchronized with musical piece reproduction, comprising:
   a situation estimating portion that estimates a situation expressed by the musical piece;
   an image specifying portion that specifies at least one pivotal image suited for the estimated situation from images constituted by scenes having a time-series order that are stored in an image database;
   a scenario generating portion that generates a scenario associating the scenes constituting the at least one pivotal image with each section of the musical piece;
   an adjustment image specifying portion that extracts a keyword from lyrics of the musical piece for each section of the musical piece and that specifies an adjustment image using the extracted keywords; and
   a scenario adjustment portion that adjusts the scenario by using the adjustment image by evaluating a degree of relevance between the adjustment image and a scene in the at least one pivotal image, the degree of relevance indicating a relationship of meta information of the at least one pivotal image or the adjustment image to the extracted keywords, the at least one pivotal image being modified in accordance with the evaluation.

2. The scenario generation system according to claim 1, wherein the scenario generating portion generates a scenario associating the scene of the at least one pivotal image with each section of the musical piece while maintaining the time-series order.

3. The scenario generation system according to claim 1, wherein the situation estimating portion estimates a situation expressed by the musical piece by analyzing lyrics of the musical piece.

4. The scenario generation system according to claim 1, wherein the scenario adjustment portion adjusts the scenario by using the adjustment image while maintaining the time-series order of the scenes specified in the scenario.

5. The scenario generation system according to claim 1, wherein the situation estimating portion estimates a situation expressed by a musical piece by estimating contents of each category corresponding to the situation expressed by the musical piece.

6. The scenario generation system according to claim 1, wherein the adjustment image specifying portion compares the scene specified in the scenario with the adjustment image for each section of the musical piece on the basis of a reference set in advance and adopts either one of them as the scene newly specified in the scenario.

7. The scenario generation system according to claim 1, further comprising:
   an evaluation information collecting portion that collects evaluations on a synchronized image by the generated scenario from viewers of the synchronized image; and
   an evaluation information DB that stores the collected evaluations, wherein
   the image adjustment portion modifies a combination of the scenes specified in the scenario on the basis of the evaluation information stored in the evaluation information DB.

8. The scenario generation system according to claim 1, further comprising:

a reproduction portion that reproduces the synchronized image on the basis of the generated scenario.

9. A scenario generation method for generating a scenario used for image reproduction synchronized with musical piece reproduction, comprising the steps of:
- estimating a situation expressed by a musical piece;
- specifying at least one pivotal image suited for the estimated situation in images constituted by scenes having a time-series order that are stored in an image database;
- generating a scenario associating the scenes constituting the at least one pivotal image with each section of the musical piece;
- extracting a keyword from lyrics of the musical piece for each section of the musical piece;
- specifying an adjustment image using the extracted keywords; and
- adjusting the scenario using the adjustment image by evaluating a degree of relevance between the adjustment image and a scene in the at least one pivotal image, the degree of relevance indicating a relationship of meta information of the at least one pivotal image or the adjustment image to the extracted keywords, the at least one pivotal image being modified in accordance with the evaluation.

10. A non-transitory computer readable recording medium having recorded thereon a scenario generation program for generating a scenario used for image reproduction synchronized with musical piece reproduction, the scenario generation program causing a computer to execute the processes of:
- estimating a situation expressed by a musical piece;
- specifying at least one pivotal image suited for the estimated situation in images constituted by scenes having a time-series order that are stored in an image database;
- generating a scenario associating the scenes constituting the at least one pivotal image with each section of the musical piece;
- extracting a keyword from lyrics of the musical piece for each section of the musical piece;
- specifying an adjustment image using the extracted keywords; and
- adjusting the scenario using the adjustment image by evaluating a degree of relevance between the adjustment image and a scene in the at least one pivotal image, the degree of relevance indicating a relationship of meta information of the at least one pivotal image or the adjustment image to the extracted keywords, the at least one pivotal image being modified in accordance with the evaluation.

* * * * *